UNITED STATES PATENT OFFICE.

JEAN B. AMYOT, OF QUEBEC, PROVINCE OF QUEBEC, CANADA, ASSIGNOR OF ONE-HALF TO LOUIS NAPOLEON CARRIER, OF SAME PLACE.

PREPARATION OF ASBESTUS AND ARTICLES OR GOODS MADE THEREFROM.

SPECIFICATION forming part of Letters Patent No. 281,951, dated July 24, 1883.

Application filed June 14, 1883. (No specimens.)

*To all whom it may concern:*

Be it known that I, JEAN B. AMYOT, of Quebec, in the province of Quebec and Dominion of Canada, have invented certain new and useful Improvements in the Preparation of Asbestus and in Articles or Goods made therefrom, of which the following is a full, clear, and exact description.

The object of this invention is to manufacture asbestus goods or articles of different kinds, which shall be impermeable or impervious to water, without interfering with the natural or incombustible character of the asbestus, or rather without impairing the protection against combustion which is secured by the asbestus.

Asbestus has been made water-proof by saturating it with tar, which, however, being highly inflammable, detracts from the fire-proof quality of the asbestus. My invention obviates this and has the further advantage of giving great strength to the goods made from the asbestus.

The invention consists in a novel process of treating asbestus, either in its raw state or as made into goods or articles of different kinds, by subjecting the same to the action of certain chemical agents, substantially as herein described, whereby the asbestus or goods or articles made therefrom are rendered water-proof with the advantage as regards incombustibility, hereinbefore stated as being the object of my invention. I take, for instance, in the proportion of about one pound (more or less) of isinglass, gelatine, or good glue, and after soaking the same in cold water, subsequently dissolve it in about four gallons of hot water. To the solution thus produced I then add about ten (10) ounces of bichromate of potassium, (5) five ounces, or thereabout, of glycerine, and, if desired, about two (2) ounces of silicate of soda, but this last-named ingredient is optional, and may be omitted. I next mix with this compound or solution the asbestus fiber to be treated—that is, asbestus in its raw or unmanufactured state—or else steep therein the manufactured asbestus goods or articles to be made water-proof, the solution during such treatment being kept at a temperature of about 200° Fahrenheit for a period varying from ten minutes to one hour, more or less, or until the asbestus is thoroughly permeated with the solution. No special apparatus is necessary for thus treating the asbestus, any suitable tank or mixer serving the purpose, and after being thoroughly treated, as described, the asbestus is removed and the surplus solution expelled from it by passing the material between hot rollers, or otherwise subjecting it to pressure for the purpose. The chemically-treated asbestus, or asbestus manufactured goods, as the case may be, should then be dried by subjecting the same to the action of heat and exposure to the sun.

If necessary, after the goods have been dried they may be steeped or rinsed for a few minutes in water for the purpose of removing any excess of the bichromate of potassium. This washing also removes some of the glycerine which was added for the purpose of keeping the asbestus pliable. A prolonged steeping would leave the asbestus hard and stiff.

Having thus described my invention, what I claim as new, and desire to secure by Letters Patent, is—

1. The within-described process of treating or preparing asbestus or goods or articles made of asbestus, and rendering the same impermeable or impervious to water by mixing or steeping said material or articles in a heated solution of isinglass, gelatine, or glue, glycerine, and bichromate of potassium, with or without the addition of silicate of soda, substantially as specified.

2. In the preparation of asbestus or goods or articles made of asbestus, and rendering the same water-proof, the process herein described of treating said material or articles, by first mixing or steeping the same in a heated solution in water, mainly or wholly composed of isinglass, gelatine, or glue, glycerine, and bichromate of potassium, in or about the proportions specified, and afterward expelling the surplus solution from and drying said material or goods, essentially as herein set forth.

JEAN B. AMYOT.

Witnesses:
BENJAMIN GALE,
THOS. HOWELL.